(12) United States Patent
Dunlap

(10) Patent No.: US 7,504,031 B2
(45) Date of Patent: Mar. 17, 2009

(54) ION SEPARATION AND GAS GENERATION

(76) Inventor: Henry R. Dunlap, Cairnwood Village, D-108, P.O. Box 550, Bryn Athyn, PA (US) 19009

( * ) Notice: Subject to any disclaimer, the term of this patent is extended or adjusted under 35 U.S.C. 154(b) by 45 days.

(21) Appl. No.: 11/753,812

(22) Filed: May 25, 2007

(65) Prior Publication Data

US 2007/0221578 A1    Sep. 27, 2007

Related U.S. Application Data

(63) Continuation-in-part of application No. 11/504,235, filed on Aug. 15, 2006, now Pat. No. 7,223,335.

(60) Provisional application No. 60/708,457, filed on Aug. 16, 2005.

(51) Int. Cl.
*C02F 1/48* (2006.01)

(52) U.S. Cl. ............... 210/222; 210/243; 422/186.01; 204/660; 204/664

(58) Field of Classification Search ............ 422/186.01; 210/695, 748, 222, 243; 204/660, 664
See application file for complete search history.

(56) References Cited

U.S. PATENT DOCUMENTS

| | | | |
|---|---|---|---|
| 3,474,014 A | 10/1969 | Aul | 204/545 |
| 5,891,332 A | 4/1999 | Okamoto | 210/223 |
| 6,096,220 A | 8/2000 | Ohkawa | 210/695 |
| 6,293,406 B1 | 9/2001 | Miller et al. | 209/39 |
| 6,346,180 B1 | 2/2002 | Gonzalez et al. | 204/557 |
| 6,768,109 B1 | 7/2004 | Brokaw et al. | 250/298 |
| 6,783,687 B2 | 8/2004 | Richard | 210/695 |

*Primary Examiner*—David A Reifsnyder
(74) *Attorney, Agent, or Firm*—Fox Rothschild LLP

(57) ABSTRACT

A device for separating ions from a fluid stream is disclosed. The device includes a conduit eccentric and parallel to an axis of rotation. An inductor coil surrounds the conduit and forms a magnetic field parallel to the axis. The conduit has an inlet and three outlets. The outlets are arranged at different radial distances from the axis. The coil and the conduit are rotatable relative to one another about the axis. Fluid flows through the conduit to the outlets and the ions therein experience a force as they move perpendicular to the magnetic field. Ions of one polarity move toward the axis and exit the conduit from the innermost outlet. Ions of an opposite polarity move away from the axis and exit the conduit from the outermost outlet. Fluid substantially devoid of ions exits from the middle outlet. A method of generating gas from ion streams is disclosed.

6 Claims, 9 Drawing Sheets

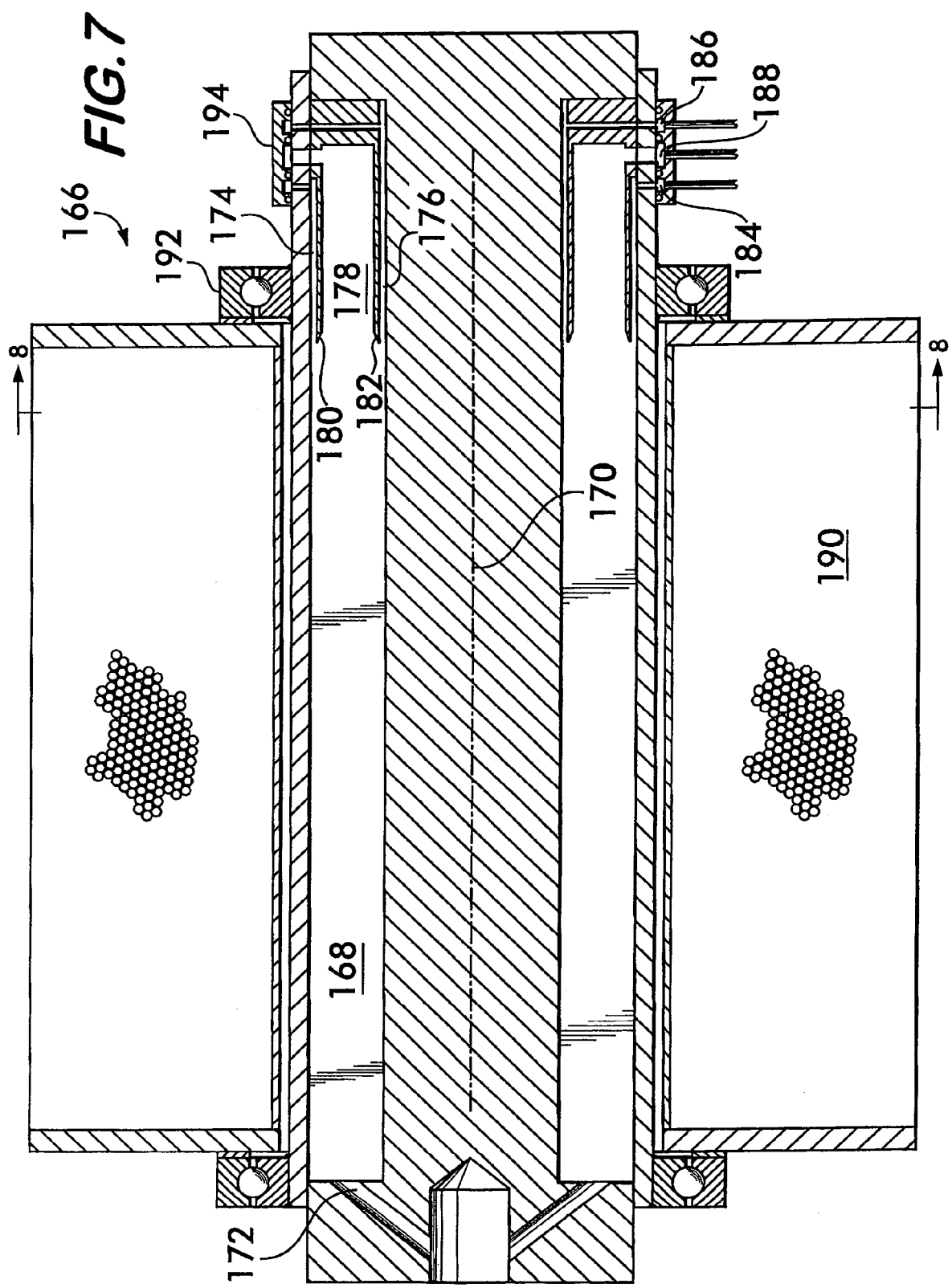

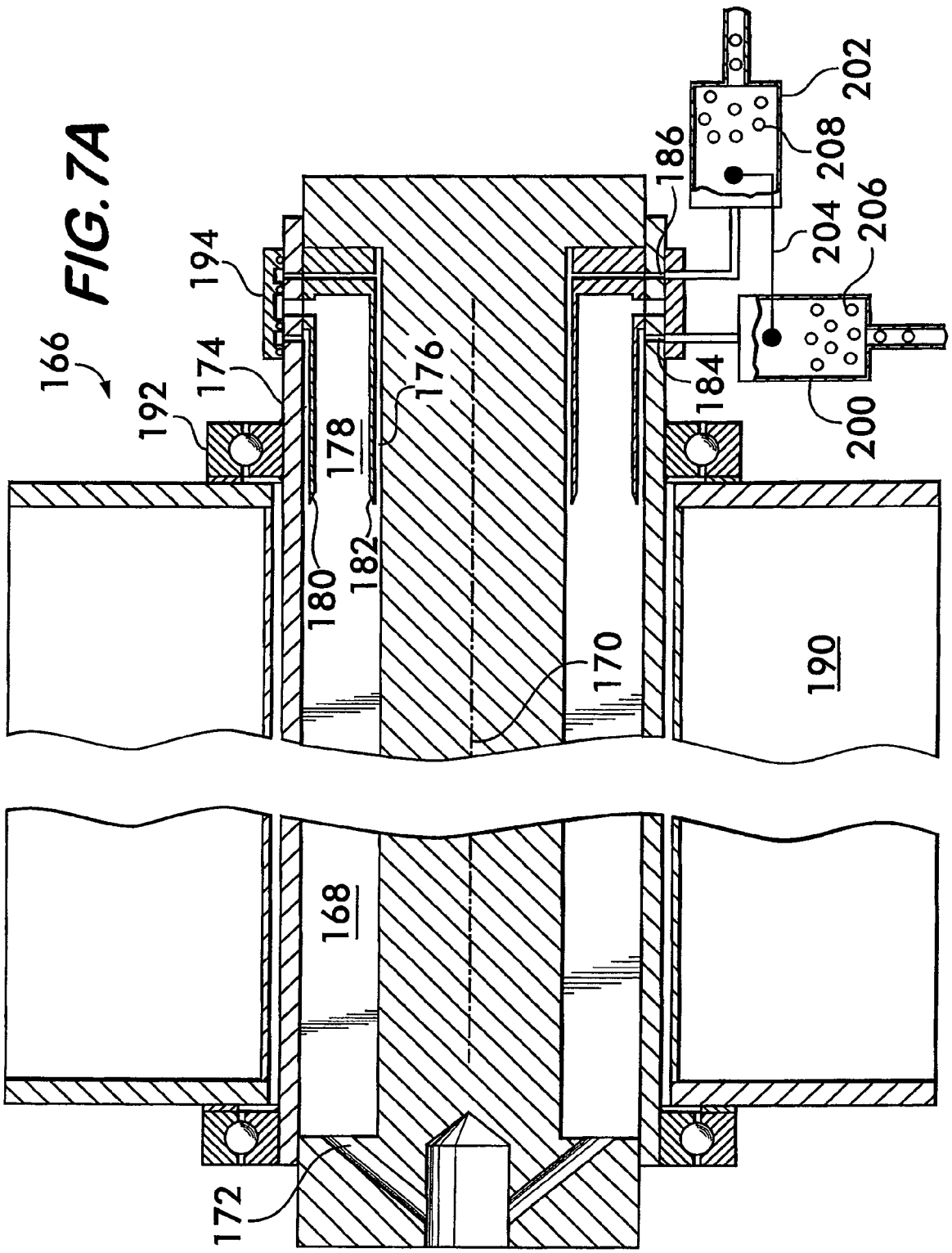

ION SEPARATION AND GAS GENERATION

CROSS REFERENCE TO RELATED APPLICATIONS

This application is a continuation-in-part of U.S. application Ser. No. 11/504,235, filed Aug. 15, 2006, which is based on and claims priority to U.S. Provisional Application No. 60/708,457, filed Aug. 16, 2005.

FIELD OF THE INVENTION

The invention is directed to devices for separating and removing ions from a fluid and using the ions to generate a gas such as hydrogen.

BACKGROUND OF THE INVENTION

Removal of ions from a fluid, such as occurs in the desalination of water, is commonly effected by evaporative techniques which require considerable energy. The water must be heated to steam, the steam drawn off and condensed. While such techniques may be acceptable for producing relatively small amounts of water, the large latent heat of vaporization of water renders such techniques impractical for desalinating large quantities of water, for example, for agricultural or industrial use.

Evaporative techniques are further impractical under conditions where significant amounts of fuel are unavailable, or it is impractical to generate the heat needed for desalination. For example, survivors from a shipwreck or a plane crash stranded on the ocean cannot normally boil water to steam and condense the steam on a raft. There is a need for an ion separation and removal device that operates more economically than evaporative techniques and is useable under primitive or adverse conditions.

SUMMARY OF THE INVENTION

The invention concerns a device for separating ions from a fluid. The device comprises an elongated conduit oriented substantially parallel to and positioned eccentric to an axis of rotation. An inlet is positioned at one end of the conduit, and a first ion duct is positioned at an opposite end of the conduit. The first ion duct is in fluid communication with the conduit. A first exit port is in fluid communication with the first ion duct. A second ion duct is positioned at the opposite end of the conduit and is also in fluid communication with the conduit. The second ion duct is positioned closer to the axis of rotation than the first ion duct. A second exit port is in fluid communication with the second ion duct. An inductor coil surrounds the conduit. The coil produces a magnetic field substantially parallel to the axis of rotation when an electrical current flows therethrough. Either the coil or the conduit is rotatable about the axis of rotation. The fluid containing the ions enters the inlet and flows through the conduit. The magnetic field exerts a force on the ions in the fluid. Ions having one polarity are moved radially away from the axis of rotation, while ions having an opposite polarity are moved radially toward the axis of rotation. Ions having the one polarity enter the first ion duct and exit through the first exit port, and ions having the opposite polarity enter the second ion duct and exit through the second exit port.

In one embodiment the conduit is rotated about the axis. The device may further comprise a neutral duct positioned between the first and second ion ducts. The neutral duct is in fluid communication with the conduit. A third exit port is in fluid communication with the neutral duct. In this configuration a remainder of the fluid from which the ions are separated enter the neutral duct and exit though the third exit port.

In a preferred embodiment the device comprises a plurality of the conduits.

The device also encompasses a method of separating ions within a fluid. The method comprises:
(a) establishing a magnetic field along an axis;
(b) creating a flow of the fluid in a stream passing through the magnetic field, the stream being positioned eccentric to and oriented substantially parallel to the axis;
(c) rotating at least one of the stream and the magnetic field about the axis whereby the ions within the fluid experience a force moving the ions toward or away from the axis depending upon the polarity of the ion's electrical charge.

The method may also include drawing, from the stream, ions having one polarity from a first region proximate to the axis, and ions having an opposite polarity from a second region distal to the axis.

The invention also encompasses a method of generating hydrogen and chlorine gas from an aqueous solution comprising sodium and chlorine ions. The method comprises:
(a) establishing a magnetic field along an axis;
(b) creating a flow of the solution in a stream passing through the magnetic field, the stream being positioned eccentric to and oriented substantially parallel to the axis;
(c) rotating at least one of the stream and/or the magnetic field about the axis whereby the sodium ions and the chlorine ions experience a force, the sodium ions being moved toward or away from the axis to form a stream comprising sodium ions and water, the chlorine ions being moved toward or away from the axis in an opposite direction to the sodium ions to form a stream comprising chlorine ions and water;
(d) conducting the sodium ion and water stream into a first chamber;
(e) conducting the chlorine ion and water stream into a second chamber;
(f) electrically connecting the sodium ion and water stream in the first chamber with the chlorine ion and water stream in the second chamber; wherein
the sodium ions are converted to sodium atoms which replace hydrogen atoms in the water in a chemical reaction releasing hydrogen gas and sodium hydroxide into the water within the first chamber.

Similarly, the chlorine ions are converted to chlorine atoms which precipitate out of solution in the form of chlorine gas.

BRIEF DESCRIPTION OF THE DRAWINGS

FIG. 7 is a longitudinal sectional view of another embodiment of a device for ion separation according to the invention;

FIG. 7A is a longitudinal sectional view of another embodiment of a device for ion separation and generation of hydrogen gas according to the invention.

DETAILED DESCRIPTION OF THE EMBODIMENTS

Figure 1:
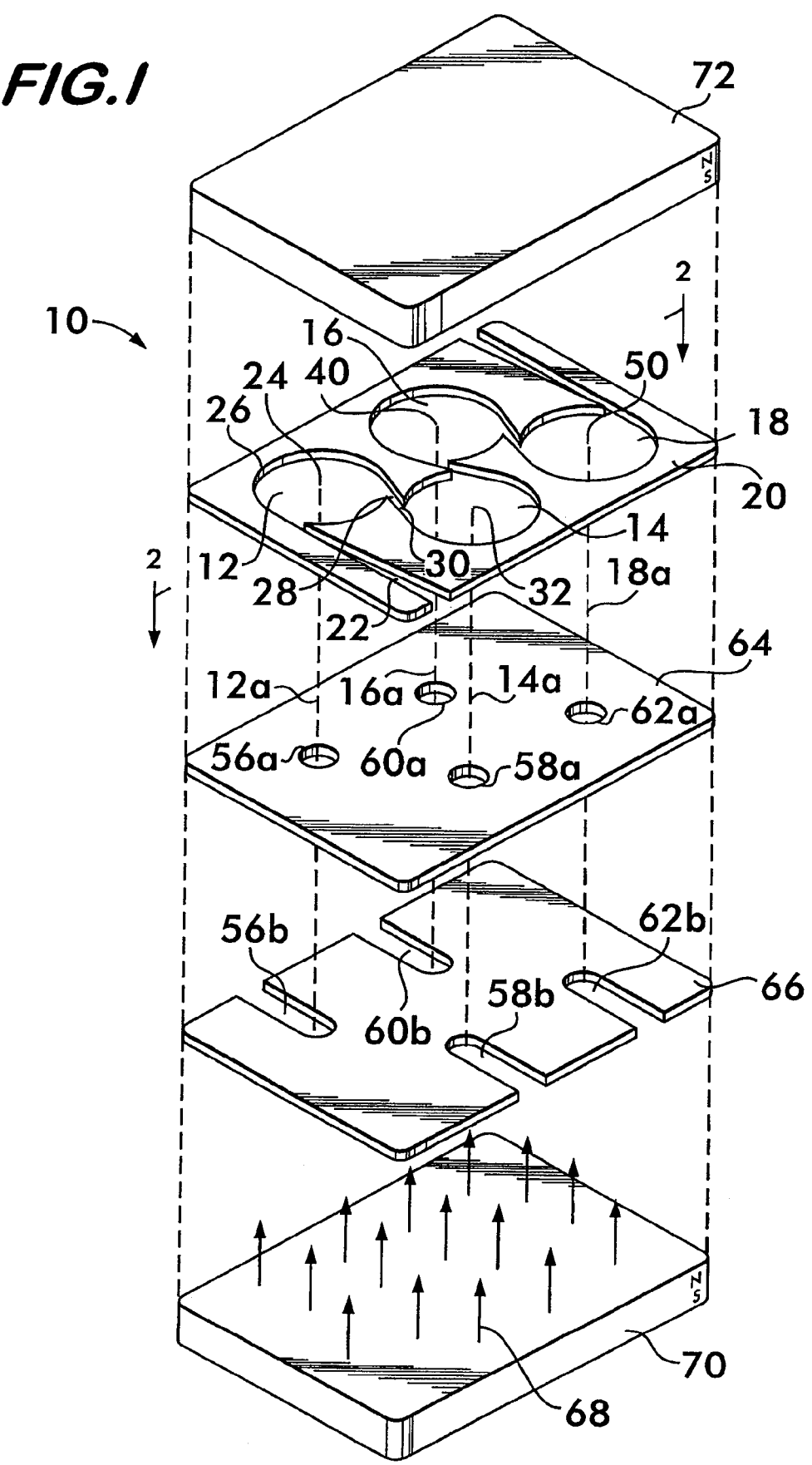
FIG. 1 is an exploded perspective view of an embodiment of a device for ion separation according to the invention.

FIG. 1 shows an exploded view of a device 10 for separating ions from a fluid. Device 10 comprises a plurality of chambers, four in this example, numbered 12, 14, 16 and 18. The chambers are defined by a plate 20 of non-magnetic material. Each chamber has an inlet and an outlet that intersect the chamber at its periphery. The inlet 22 of first chamber 12 comprises the inlet to the device 10 and is aligned offset from the center region 24 of the chamber 12 so as to induce a clockwise circular flow in fluid entering the chamber 12 about an axis 12a extending through the chamber. The chamber 12 also has a curved, preferably circular periphery 26 which further facilitates circular flow of fluid within it. The peripheral outlet 28 also intersects the chamber 12 at its periphery and is aligned offset from the center region so as to allow fluid near the periphery 26 to exit the chamber as described in detail below.

The outlet 28 of chamber 12 is in fluid communication with the inlet 30 of chamber 14. The inlet 30 is configured similarly to inlet 22 to induce a circular flow, this time counter clockwise in chamber 14. In this embodiment, this pattern is repeated, wherein the peripheral outlet of one chamber is in fluid communication with the inlet of the next chamber and arranged so as to induce a circular flow about a respective axis in each chamber, the flow circulating in opposite directions in adjacent chambers. Chambers 14 and 16 may be considered intermediate chambers and chamber 18 a last chamber whose outlet 54 provides an outlet from the device 10.

Each chamber also has a respective central outlet positioned proximate to the chamber center regions 24, 32, 40 and 50. The central outlets are defined by two plates 64 and 66 positioned below plate 20. Plate 64, positioned adjacent to plate 20, is used to define apertures 56a, 58a, 60a and 62a that are sized to draw fluid from the respective center region of each chamber. The apertures feed respective conduits 56b, 58b, 60b and 62b defined in the lowermost plate 66. The conduits allow fluid to exit the device 10. Plates 64 and 66 are also formed of non-magnetic material.

A magnetic field 68 extends through the chambers 12, 14, 16 and 18. The field is oriented so that it is substantially perpendicular to the fluid flow, i.e., substantially aligned with the axes 12a, 14a, 16a and 18a through each chamber. In this example, the magnetic field is provided by a pair of permanent magnets 70 and 72, magnet 72 overlying plate 20 and magnet 70 overlying plate 66. The north pole of magnet 70 faces the south pole of magnet 72, thereby orienting the field 68 upwardly through the chambers as depicted in FIG. 1. The plates 20, 64 and 66 and magnets 70 and 72 are sealingly joined to one another so that fluid flows only through the inlets, chambers and outlets as described below.

Operation of the device 10 is described with reference to FIG. 2. Ion bearing fluid 74 is conducted through inlet 22 to first chamber 12 where the fluid flows in a clockwise circulation within the chamber. Being charged particles moving in a magnetic field 68, the ions experience a force F described by the vector relation $F=qV \times B$ where q is the magnitude and polarity of the ions' charge, V is the ion velocity (direction and magnitude), and B is the magnetic field (strength and orientation). The vector operator "x" is the vector cross product.

Figure 2:
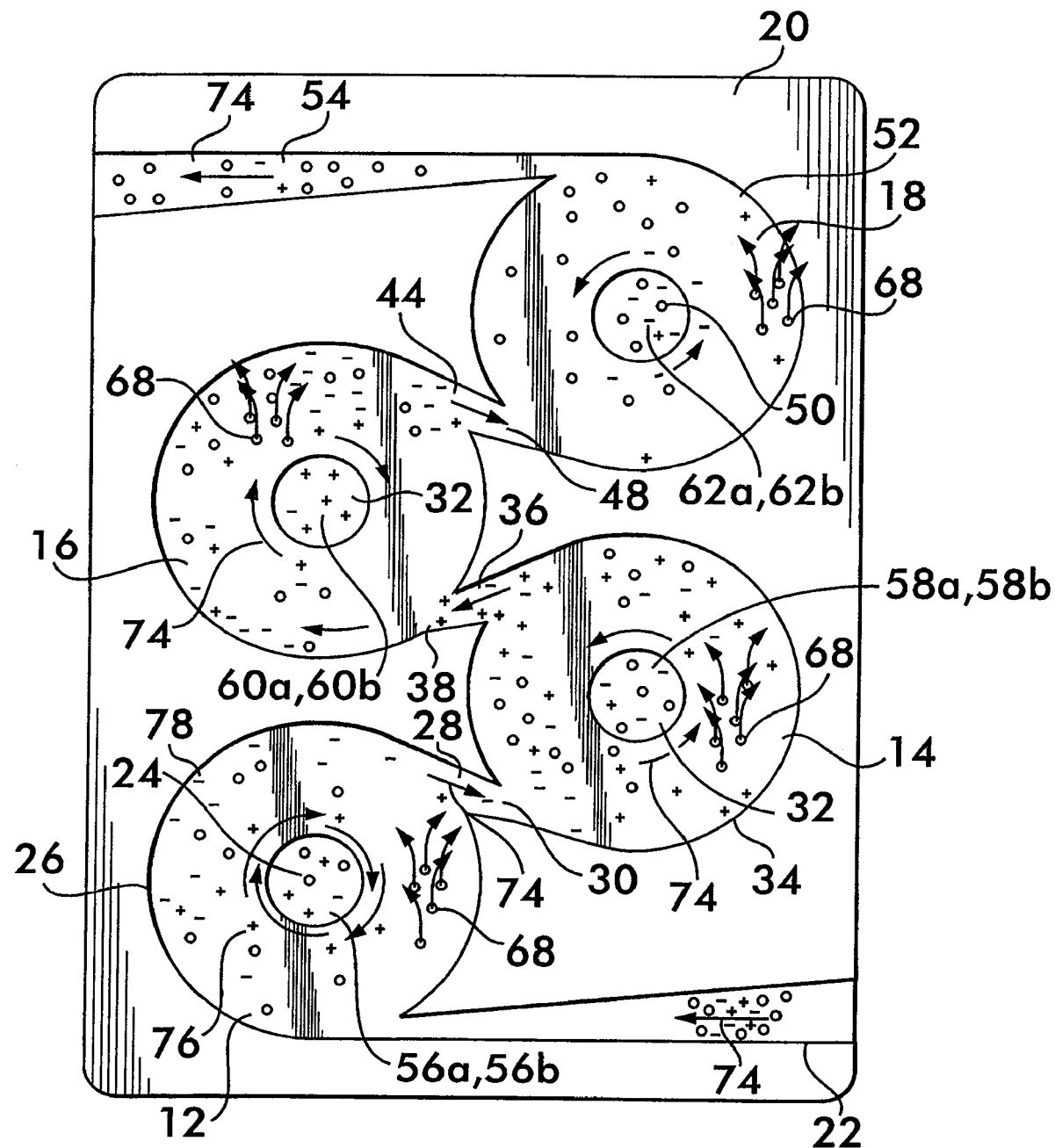
FIG. 2 is a sectional plan view taken at line 2-2 of FIG. 1.

Positive ions 76 moving in a clockwise circulation in chamber 12 through magnetic field 68 oriented out of the plane of FIG. 2 will experience a force F moving them inwardly toward the center region 24. Conversely, negative ions 78 in chamber 12 will experience a force −F, moving them toward the periphery 26. As a result of the magnetically induced force, the negative ions 78 will tend to exit chamber 12 through outlet 28, and the positive ions 76 will tend to exit the chamber through the outlet 56a, 56b located proximate to the center region 24. The portion of the fluid stream that exits the device through outlet 56a, 56b thus contains a higher concentration of positive ions. This portion may be sent to another ion separation device for further processing. The portion of the fluid stream that exits through outlet channel 28 contains a higher concentration of negative ions and enters intermediate chamber 14 through its inlet 30. Due to the position and orientation of inlet 30 at the periphery 34, the fluid stream 74 has a counter clockwise flow in chamber 14. The circulation of the flow in all of the chambers is enhanced by orienting the inlets offset from the center regions and giving the peripheries a curved, preferably circular shape.

The reversal of the ion velocity vector causes the forces on the ions to reverse so that positive ions in chamber 14 are moved toward the periphery 34 and negative ions toward the center region 32. A portion of the fluid stream having a higher concentration of negative ions exits the device through outlet 58a, 58b, while another portion of the stream having a higher concentration of positive ions exits chamber 14 through outlet 36. Outlet 36 is in fluid communication with inlet 38 of chamber 16. The circulation of the flow is again reversed, and moves clockwise in chamber 16, resulting in positive ions exiting the device through outlet 60a, 60b, and negative ions exiting chamber 16 through outlet 44.

As the fluid stream 74 passes through the various chambers, ions are separated at each stage so that the overall concentration of ions is significantly diminished by the time the stream enters the last chamber 18. The circulation of the flow in chamber 18 is again reversed from chamber 16 so negative ions are moved to the center region 50 where they exit through outlet 62a, 62b. Positive ions move to the periphery 52 and exit the device through outlet 54. The stream 74 that exits outlet channel 54 may have its ion concentration reduced to the desired level and be suitable for use, for example as irrigation or drinking water. If four stages of separation are not sufficient to reduce the ion concentration to an acceptable level, more stages could be added, for example, by adding more intermediate chambers or by operating several devices in cascade.

Figure 3:
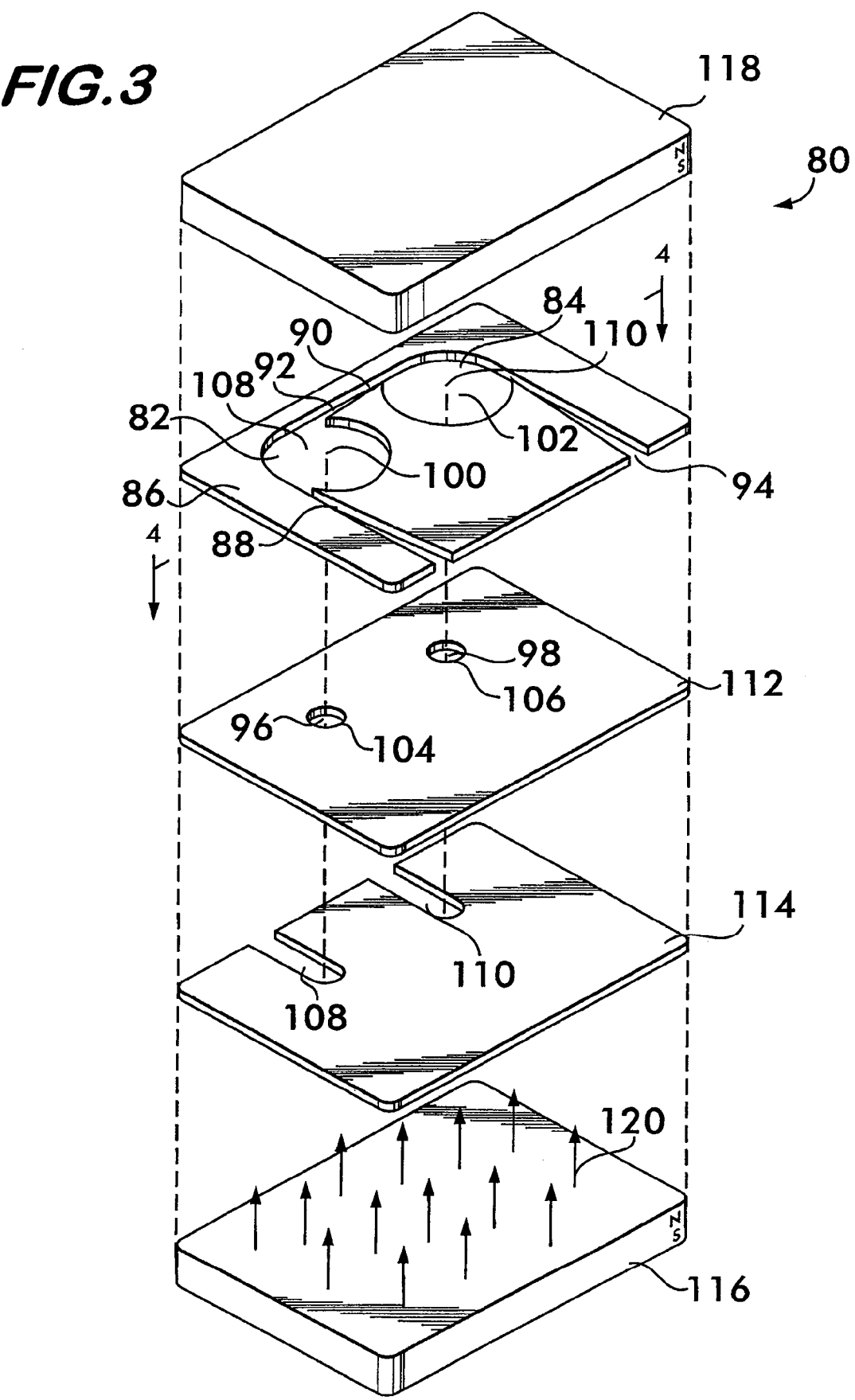
FIG. 3 is an exploded perspective view of another embodiment of a device for ion separation.
Figure 4:
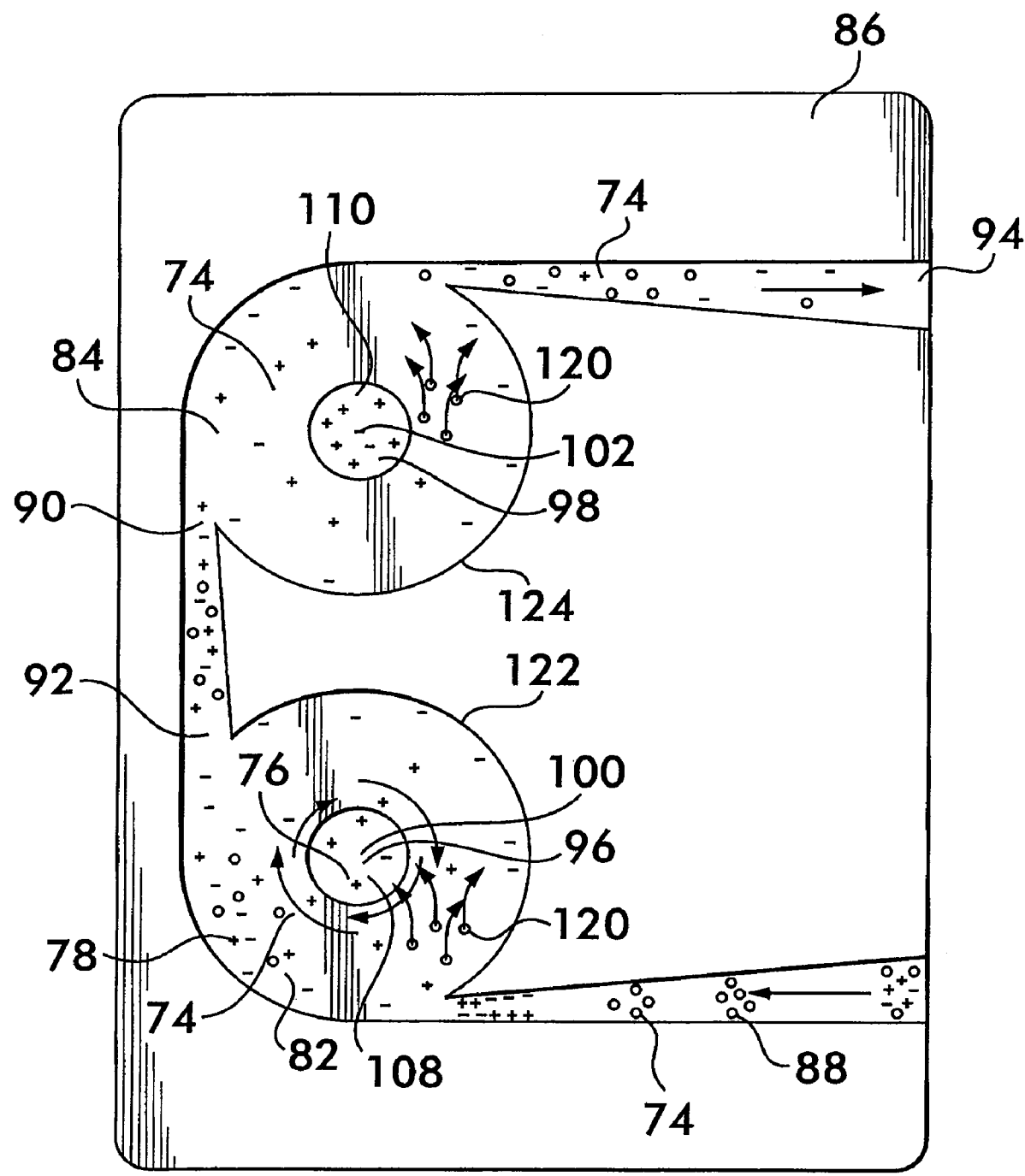
FIG. 4 is a sectional plan view taken at line 4-4 of FIG. 3.

FIG. 3 illustrates another embodiment 80 of a device for separating ions from a fluid stream. Device 80 comprises a plurality of chambers, in this example two chambers 82 and 84 defined by a plate 86. The chambers again have respective peripheral inlets 88 and 90 and peripheral outlets 92 and 94 also defined in plate 86. Outlet 92 of chamber 82 is in fluid communication with inlet 90 of chamber 84. Central outlets 96 and 98, positioned proximate to center regions 100 and 102, are defined by apertures 104 and 106 and conduits 108 and 110 in two overlying plates 112 and 114. The plates 86, 112 and 114 are again sandwiched between magnets 116 and 118 producing a magnetic field 120 through the chambers 82 and 84. In device 80, however, the circulation of the fluid flow 74 is in the same direction in both chambers. Thus, as shown in FIG. 4, for clockwise circulation and a magnetic field 120 out of the plane of the figure, negative ions 78 will tend to move outwardly toward the peripheries 122, 124 of each chamber and positive ions 76 will move toward the center regions 100 and 102. A portion of the fluid stream rich in positive ions exits the device from outlets 96 and 98, and other portions of the stream, rich in negative ions, exit through outlet 94. Device 80 may be used to further separate the ion streams by feeding the output streams from one device 80 into other similar devices in a cascade arrangement.

Figure 5:
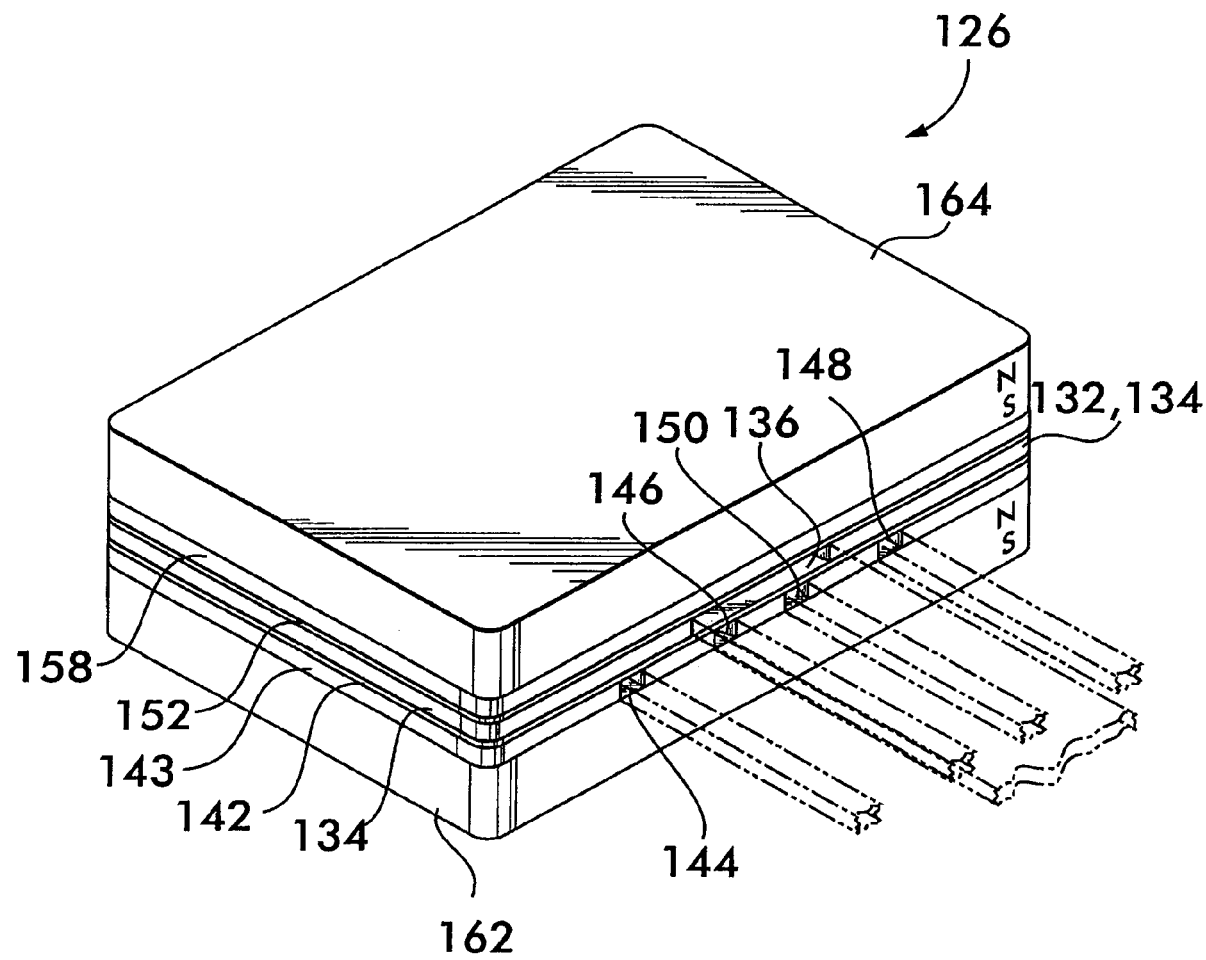
FIG. 5 is a perspective view of another embodiment of a device for ion separation.
Figure 6:
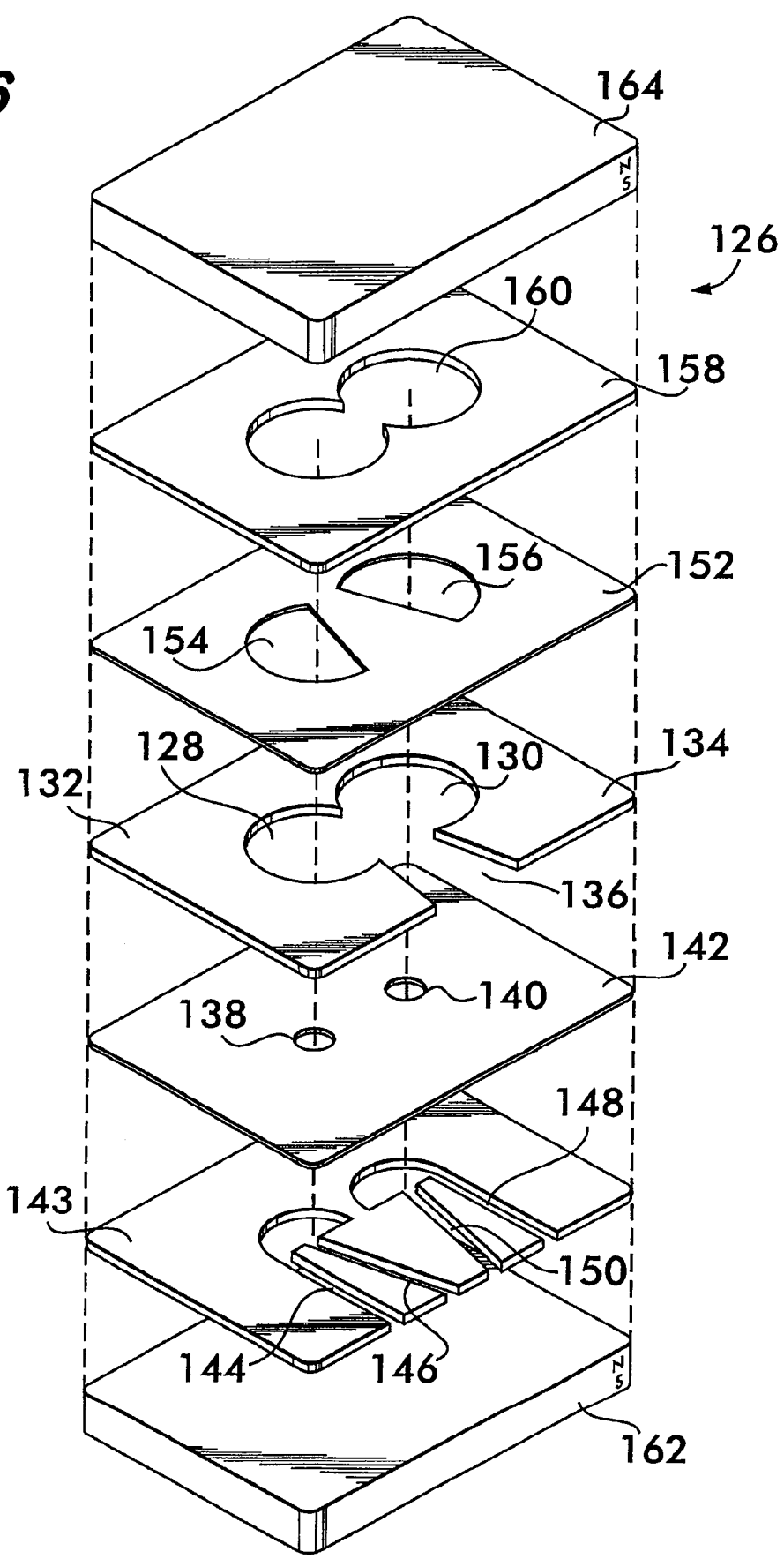
FIG. 6 is an exploded perspective view of the device shown in FIG. 5.

FIG. 5 shows a view of another embodiment of an ion separation device 126 according to the invention, and FIG. 6 shows an exploded view of that embodiment. Device 126 comprises two chambers 128 and 130, arranged side-by-side and defined by a plate 132. The chambers are positioned in substantially the same plane 134 and share a common inlet 136 through which fluid comprising ions in solution, for example, salt water, is supplied.

Flow of fluid from each chamber 128 and 130 is controlled by a respective orifice. Orifice 138 is associated with chamber 128, and orifice 140 is associated with chamber 130. The orifices are defined by a plate 142 positioned adjacent to the plate 132 defining chambers 128 and 130. Each orifice is in fluid communication with respective central and peripheral outlets defined in a plate 143. Fluid from chamber 128 is directed through orifice 138 and then may exit device 126 through either peripheral outlet 144 or central outlet 146 in plate 143. Fluid from chamber 130 is directed through orifice 140 and then may exit through peripheral outlet 148 or central outlet 150 in plate 143.

A divider plate 152 is positioned adjacent to plate 132 on an opposite side from plate 142. Divider plate 152 has openings 154 and 156 that respectively overlie chambers 128 and 130 and provide fluid communication to a bridge plate 158. Bridge plate 158 is positioned adjacent to the divider plate 152 and has a "figure 8" shaped opening 160 that provides fluid communication between chambers 128 and 130. The openings 154 and 156 in divider plate 152 control the flow of fluid between the chambers by virtue of their size and position relatively to the chambers. Note that the openings 154 and 156 are smaller than the chambers and are positioned outwardly away from the common inlet 136 to prevent mixing of the fluid at the inlet.

The chambers, orifices, outlets, divider and bridge plates are preferably sandwiched between permanent magnets 162 and 164 positioned on opposite sides of the device 126. Magnets 162 and 164 are arranged with opposite poles in facing relation so as to provide a magnetic field that is directed transversely and preferably substantially perpendicularly to plane 134 in which the chambers reside. It is understood that the magnets 162 and 164 need not be permanent magnets, as electromagnets are also feasible.

In operation, liquid containing the ions in solution enters the device 126 through inlet 136. The ions, being charged particles moving preferably substantially perpendicularly to magnetic lines of flux extending transversely to plane 134, experience a force according to the formula F=qV×B, where q is the ion's electrical charge, V is its velocity perpendicular to the magnetic field, B is the magnetic field strength, and "x" indicates a vector cross product operation as noted previously. The force on the particles acts perpendicular to both the direction of the magnetic field and the direction of particle motion perpendicular to the field and will direct the particles in curved paths into either chamber 128 or 130, depending upon the polarity of their charge. In this example, we assume the magnetic field is directed from magnet 162 to magnet 164. The direction of ion motion is toward the chambers through inlet 136. The vector cross product in this situation results in a force directing positively ions into chamber 130 and negatively charged ions into chamber 128.

The ions in chambers 128 and 130 swirl around in a vortex engendered by both the shape of the chambers and the continued effect of the magnetic field, which tends to drive the positive ions in chamber 130 clockwise and toward the center of the vortex in that chamber and the negative ions in chamber 128 counterclockwise and toward the center of the vortex in that chamber. The fluid stream then flows through orifices 138 and 140 and to the various outlets. Because of the relatively higher concentration of ions in the center of the vortices, fluid drawn off through central outlets 146 and 150 will tend to have higher concentrations of ions than the fluid drawn off through peripheral outlets 144 and 148, thereby effecting a separation of ions from the fluid. The fluid exiting through peripheral outlets 144 and 148 may be sent through multiple stages of ion separation in additional devices 126 in a cascading manner until the desired level of ion concentration is reached. Fluid drawn from central outlets 146 and 150 may be fed back into inlet 18 of device 10 or may be discarded.

It is recognized that, despite the magnetic force acting on the ions as they traverse inlet 136, some particles will enter the "wrong" chamber, i.e., some positive ions will enter chamber 128 and some negative ions will enter chamber 130. Ions circulating with the fluid in the "wrong" chamber will be directed by both the magnetic force and the centrifugal force of the vortex outwardly toward the periphery of the chambers. This will cause the ions to exit the chambers 128 and 130 through openings 154 and 156 in divider plate 152 and enter the figure 8 shaped opening 160 of bridge plate 158. Because the opening 160 is in fluid communication with both chambers 128 and 130, ions can travel between chambers. When an ion moves from the "wrong" chamber to the correct chamber, it is directed toward the center of the vortex by the magnetic field and exits the chamber through one of the peripheral or central outlets as described above.

Preferably, flow through the device has little or no turbulence to prevent mixing of the ions and allow their separation into the appropriate chamber by the interaction of the ions with the magnetic field. The lack of turbulence will also allow for higher concentrations of ions to be drawn off at the center outlets 146 and 150.

Figure 8:
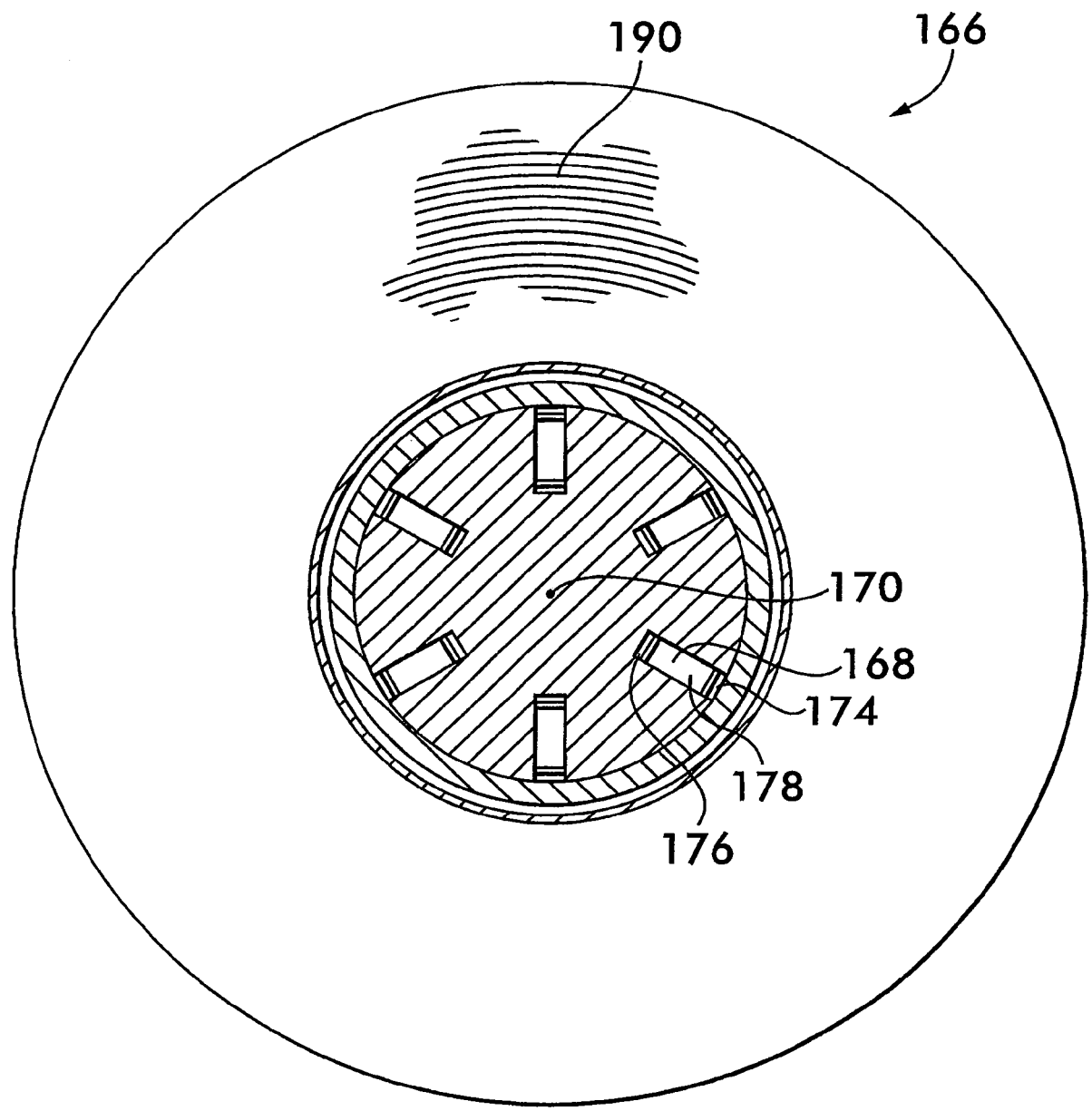
FIG. 8 is a cross-sectional view taken at line 8-8 of FIG. 7.

FIG. 7 shows another embodiment of a device 166 for separating ions from a fluid. Device 166 comprises one or more elongated conduits 168 that are positioned around and parallel to an axis of rotation 170. The conduits are eccentric to the axis for reasons described below. Each conduit 168 has an inlet 172 at one end. The opposite end of each conduit is in fluid communication with three ducts. A first ion duct 174 is positioned farthest from the axis of rotation 170; a second ion duct 176 is positioned closest to the axis of rotation, and a neutral duct 178 is positioned between the first and second ion ducts. FIG. 8 shows a cross sectional view that illustrates the preferred relative position of the ion and neutral ducts, positioned at different radial distances from the axis of rotation 170. In a preferred embodiment, the ducts 174, 176 and 178 are formed by dividing the opposite end of each conduit using interior walls 180 and 182 that extend lengthwise along the conduit.

Each duct is in fluid communication with a respective exit port. The first ion duct 174 is in communication with a first exit port 184, the second ion duct 176 is in communication with a second exit port 186, and the neutral duct 178 is in communication with a third exit port 188.

An inductor coil 190 is positioned surrounding the conduits 168. Preferably, the coil is centered on the axis of rotation 170. When energized, the coil produces a magnetic field that is oriented substantially parallel to the axis of rotation. Coil 190 is mounted on the channels by bearings 192 which permit relative rotation between the coil and the conduits. The device will operate if the coil is fixed and the conduits rotate, if the conduits are fixed and the coil rotates, or if both the conduits and the coil rotate, preferably in opposite directions. It is recognized that rotation of the conduits will require fittings such as 194 at the inlet and exit ports that provide for fluid communication between a stationary and a rotating component. Such fittings are known in the art and, therefore, not shown in detail herein. It is further recognized that rotation of the coil will require electrical connections that provide for electrical continuity between a stationary and rotating component. Such connections are also known and not shown in detail herein.

In operation, fluid containing ions in solution flows into inlets 172 and lengthwise through conduits 168. Coil 190 is charged, producing a magnetic field substantially parallel to axis of rotation 170. Relative rotation between the conduits 168 and the coil 190 moves the ions in the fluid transversely to the lines of magnetic flux, which are oriented lengthwise along the axis of rotation. The ions experience a force according to the formula $F=qV\times B$, where q is the ion's electrical charge, V is its velocity perpendicular to the magnetic field, B is the magnetic field strength, and "x" indicates a vector cross product operation. The force on the particles acts perpendicularly to both the direction of the magnetic field and the direction of particle motion perpendicular to the magnetic field and will direct the particles either radially inwardly toward the axis 170, or radially outwardly away from the axis. The further the ions are from the axis of rotation the greater their speed perpendicular to the magnetic field, hence, it is advantageous to position conduits 168 eccentrically to the axis.

For the purposes of this example, it is assumed that the magnetic field is oriented from the inlet 168 toward the exit ports 184, 186 and 188, and that the conduits rotate counter clockwise relatively to the coil when viewed from the inlet end of device 166. Under these circumstances, the force on the ions will separate the fluid in each conduit into three substantially parallel streams, a first stream having a high concentration of positive ions positioned within the conduit closest to the axis of rotation, a second stream having a high concentration of negative ions within the conduit positioned farthest from the axis of rotation, and a stream having a low concentration of either type of ion substantially between the first and second streams. It is recognized that reversal of the direction of the magnetic field or the direction of relative rotation between the conduits and the coil will exchange the position of the positive and negative ions within the conduits.

As the fluid flows along the conduits 168, the ions become more concentrated in the first and second streams. It is advantageous that the flow through the conduits have little or no turbulence so as to prevent significant mixing between the streams. The first and second ion ducts and the neutral duct are positioned within each conduit so as to receive the three streams. The first ion duct 174 receives the stream having a high concentration of negative ions, the second ion duct 176 receives the stream having the high concentration of positive ions, and the neutral duct 178 receives the stream with the low ion concentration. The streams exit the ducts through the respective exit ports 184, 186 and 188. The streams from the first and second exit ports containing the high ion concentrations may be discarded and the stream from the third exit port 188, having the low ion concentration, can be fed to subsequent stages of separation performed in ion separators such as described herein until the desired level of ion concentration is achieved.

An alternate embodiment of device 166, shown in FIG. 7A, may be used to generate hydrogen gas from an aqueous solution of sodium chloride. As shown in FIG. 7A, a first chamber 200 is in fluid communication with ion duct 174 via exit port 184 and a second chamber 202 is in fluid communication with ion duct 176 through exit port 186. The interior of the chambers are connected to one another by an electrical conductor 204. An aqueous solution comprising sodium chloride is fed into conduit 168 through inlet 172 while a magnetic field is established along axis 170 by inductor coil 190. Either the field or the conduit are rotated while the solution flows through the conduit, and the sodium and chlorine ions, having opposite charges, experience a force as described above, which moves them in opposite directions from one another either toward or away from axis 170. For the purposes of this example we assume that the field orientation and the relative rotation between the field and the conduit 168 are such that the sodium ions experience a force moving them outwardly, away from axis 170, and the chlorine ions experience an opposite force moving them inwardly, toward the axis 170. The solution is thus separated into two ion streams, one comprising a higher concentration of sodium ions and the other a high concentration of chlorine ions. The sodium ion stream, being moved outwardly, tends to flow into ion duct 174 and out through exit port 184 into chamber 200. Conversely, the chlorine ion stream, being moved inwardly, tends to flow into ion duct 176 and out through exit port 186 into chamber 202. The electrical conductor 204 between the chambers permits an electro-chemical reaction to occur within the chambers, whereby sodium ions in chamber 200 are converted to sodium atoms, and the sodium atoms replace the hydrogen in the water, forming sodium hydroxide and releasing the hydrogen as a gas 206 which may then be collected from the aqueous ion stream. In chamber 202, the chlorine ions are converted to chlorine atoms which precipitate out as chlorine gas 208, which may also be collected from the aqueous ion stream.

The chambers 200 and 202 serve to isolate the ion streams and may be mounted on the device 166 or may be separate therefrom. The chambers may comprise, for example, pipelines as shown which lead the ion streams away from the device 166. It is understood that the device and method according to the invention may be used to generate precipitates for ions other than sodium and chlorine in an aqueous solution.

Ion separation devices as described herein provide for economically efficient separation of ions from a fluid without the need for high energy expenditure. The devices may form the basis for the generation of hydrogen gas or other precipitates. The devices according to the invention are further portable and thought capable of effective operation under primitive conditions as would be encountered in the aftermath of a disaster.

What is claimed is:

1. A device for separating ions from a fluid, said device comprising:

an elongated conduit oriented substantially parallel to and positioned eccentric to an axis of rotation;

an inlet positioned at one end of said conduit;

a first ion duct positioned at an opposite end of said conduit and in fluid communication with said conduit;

a first exit port in fluid communication with said first ion duct;

a second ion duct positioned at said opposite end of said conduit and in fluid communication with said conduit, said second ion duct being positioned closer to said axis of rotation than said first ion duct;

a second exit port in fluid communication with said second ion duct;

an inductor coil surrounding said conduit, said coil producing a magnetic field substantially parallel to said axis of rotation when an electrical current flows therethrough, one of said coil and said conduit being rotatable about said axis of rotation; and wherein said fluid containing said ions entering said inlet and flowing through said conduit, said magnetic field exerting a force on said ions in said fluid, ions having one polarity being moved radially away from said axis of rotation, ions having an opposite polarity being moved radially toward said axis of rotation, ions having said one polarity entering said first ion duct and exiting through said first exit port, ions having said opposite polarity entering said second ion duct and exiting through said second exit port.

2. A device according to claim 1, wherein said conduit is rotated about said axis.

3. A device according to claim 1, further comprising:

a neutral duct positioned between said first and second ion ducts, said neutral duct being in fluid communication with said conduit;

a third exit port in fluid communication with said neutral duct; and wherein a remainder of said fluid from which said ions are separated enter said neutral duct and exit though said third exit port.

4. A device according to claim 1, further comprising a plurality of said conduits.

5. A device according to claim 1, further comprising:

a first chamber in fluid communication with said first ion duct;

a second chamber in fluid communication with said second ion duct;

an electrical conductor connected between said first and second chambers, said electrical conductor providing for an electrochemical interaction of said ions within said first and second chambers.

6. A device according to claim 5, wherein said chambers comprise pipe lines for conducting an ion stream away from said device.

* * * * *